(12) United States Patent
Fouquet et al.

(10) Patent No.: US 6,766,085 B2
(45) Date of Patent: Jul. 20, 2004

(54) PRECISELY CONFIGURING OPTICAL FIBERS AND OTHER OPTICAL ELEMENTS USING AN APERTURED WAFER POSITIONER

(75) Inventors: Julie E. Fouquet, Portola Valley, CA (US); Charles D. Hoke, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 88 days.

(21) Appl. No.: 09/968,378

(22) Filed: Oct. 1, 2001

(65) Prior Publication Data

US 2003/0063861 A1 Apr. 3, 2003

(51) Int. Cl.[7] .................................................. G02B 6/32
(52) U.S. Cl. .......................... 385/52; 385/31; 385/33; 385/88
(58) Field of Search ........................ 385/31, 33–35, 385/52, 88–94, 115

(56) References Cited

U.S. PATENT DOCUMENTS

| | | | | |
|---|---|---|---|---|
| 4,334,741 A | * | 6/1982 | Masucci | 353/38 |
| 4,812,002 A | * | 3/1989 | Kato et al. | 385/33 |
| 5,185,846 A | * | 2/1993 | Basavanhally et al. | 385/137 |
| 5,346,583 A | * | 9/1994 | Basavanhally | 216/26 |
| 6,408,120 B1 | * | 6/2002 | Dautartas | 385/52 |
| 2002/0122619 A1 | * | 9/2002 | Sandler et al. | 385/17 |
| 2002/0131754 A1 | * | 9/2002 | Kaiser et al. | 385/137 |
| 2003/0202769 A1 | * | 10/2003 | Gutierrez et al. | 385/137 |

FOREIGN PATENT DOCUMENTS

JP        09-090162 A   *   4/1997    ............ G02B/6/32

* cited by examiner

*Primary Examiner*—Akm Enayet Ullah
*Assistant Examiner*—Michelle R. Connelly-Cushwa

(57) ABSTRACT

A system for accurately aligning a plurality of optical elements includes a wafer into which are formed a plurality of holes. The holes are formed into an array and are each designed to accept an optical element. After each optical element is located and inserted into a respective hole, the optical elements are polished to be planar with the surface of the wafer. The optical elements may include fibers and lenses. The system may also include a wafer containing optical fibers optically aligned with a wafer containing lenses. The optical fibers direct light into corresponding lenses, which collimate and launch the light into an optical switch.

26 Claims, 3 Drawing Sheets

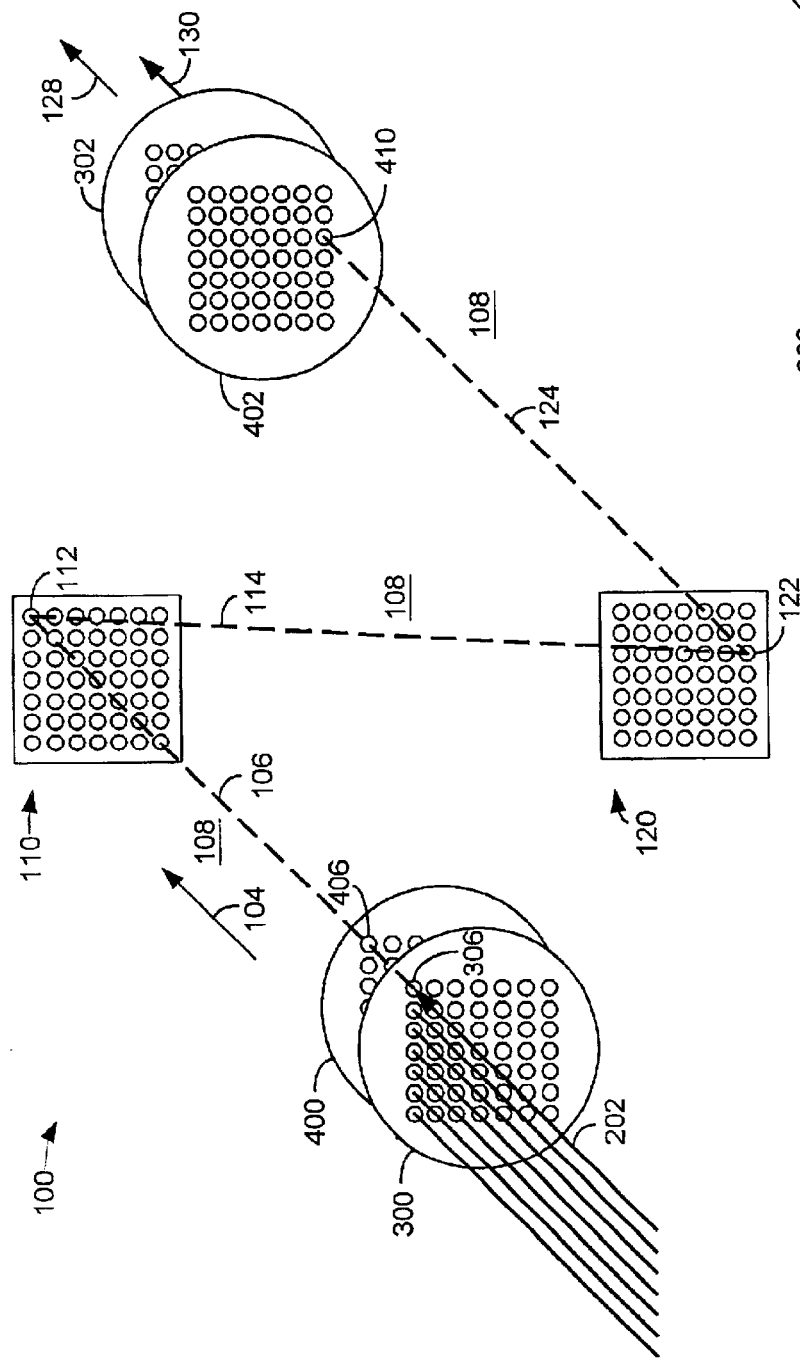
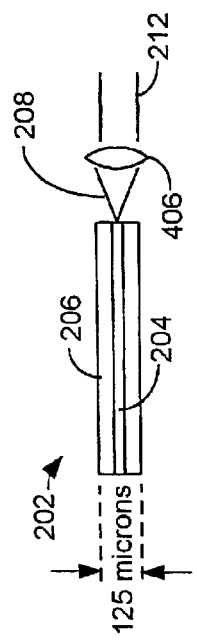
FIG. 1
FIG. 2

PRECISELY CONFIGURING OPTICAL FIBERS AND OTHER OPTICAL ELEMENTS USING AN APERTURED WAFER POSITIONER

TECHNICAL FIELD

The present invention relates generally to optical communications, and, more particularly, to precisely arranging optical elements in a two-dimensional array. Certain embodiments of the invention provide for precisely configured arrays of optical elements, such as optical fibers and lenses.

BACKGROUND OF THE INVENTION

Optical communication systems have been in existence for some time and continue to increase in use due to the large amount of bandwidth available for transporting signals. Optical communication systems provide high bandwidth and superior speed and are suitable for efficiently communicating large amounts of voice and data over long distances. Optical communication systems are typically employed for both long and short distance communications applications, but are generally most efficient when used for long distance communications. In a typical optical communication system, spans of optical fibers are connected by switching systems located along the fiber spans. These switching systems are used to both route the optical signals to their destination, and to add and remove optical signals from the optical fibers. Some optical switches require that the optical signal first be converted to an electrical signal, then switched and converted back to an optical signal. Other switching systems switch the optical signal while the signal remains in the optical domain.

One manner of switching optical signals uses a number of movable mirrors to route the optical signal through the optical switch from an input fiber to an appropriate output fiber. Such an optical switch typically receives signals from a large number of optical fibers and requires that the light from each fiber accurately impinge on an appropriate mirror. Supplying optical signals to an optical switch is sometimes referred to as "launching" light into an optical switch. The light is referred to as being launched into free space because the light travels toward the mirror without the aid of a waveguide. Unfortunately, when many optical fibers are associated with such an optical switch, accurately aligning each of the input fibers with a corresponding mirror so that the optical signals are accurately launched into the optical switch becomes difficult.

One possible manner of aligning optical fibers involves etching recesses, or grooves, into a substrate. The optical fibers are located and retained in the grooves. Multiple etched substrates may be stacked over one another and joined together, thus forming a two dimensional array of optical fibers. Unfortunately, due to the thickness variation between substrates and the significant thermal coefficient of expansion (TCE) (sometimes referred to as coefficient of thermal expansion (CTE)) of the bonding material, the mechanical tolerances of such a system are difficult to control with precision over time and temperature variations. This alignment difficulty limits the number of optical signals that can be supplied to such an optical switch.

Therefore, there is a need in the industry for accurately aligning fibers in arrays so that the output of each input fiber accurately impinges on an input mirror of an optical switch and so that each light from each output mirror of an optical switch accurately impinges on a corresponding output fiber.

SUMMARY OF THE INVENTION

The present invention provides for aligning elements, such as optical fibers and lenses, by inserting them into holes formed in a wafer. The wafer can be a thin slice of solid material; the holes can be formed using any known technique in the pattern desired for arranging the optical elements. The wafers can be silicon wafers such as those commonly used in semiconductor manufacturing; the holes can be formed using known photolithographic silicon etching techniques.

Two such wafers can be made and aligned with each other so that one array of optical elements, e.g., optical fibers, can be aligned with another array of optical elements, e.g., lenses. Thus, an optical switching system can comprise two pairs of wafers coupled by an optical matrix switch. The first pair of wafers aligns input fibers to collimating lenses that launch light into the matrix switch. The second pair of wafers aligns focusing lenses to optical fibers so that light from the matrix switch can be directed into the fibers for transmission elsewhere. The matrix switch determines the coupling between input fibers and output fibers.

The invention provides for a method for aligning optical elements. The method involves forming a plurality of through holes in a wafer, and inserting optical elements into the holes. Typically, the holes are configured in a two-dimensional array that defines the alignment of the optical elements. Preferably, the holes are etched into the wafer. For example, reactive ion etching can be used to form holes on one surface of the wafer; the holes can be converted to through holes by wet etching into the opposing surface of the wafer. Where fibers are inserted into the through holes, they can be polished to be coplanar with a first surface of the wafer, preferably a dry-etched surface. The holes can be tapered to guide fibers into proper alignment upon insertion.

The present invention provides a precise, reliable, and economical approach for aligning large numbers of fibers in a two-dimensional array and for aligning such an array of fibers with an array of lenses. The wafers can be well-characterized widely-available silicon wafers and the holes can be made precisely using mature semiconductor manufacturing methods. Fiber alignment is facilitated by the tapered shape of the holes. Concerns regarding mechanical tolerances of layered substrates in the prior art are substantially obviated by the present invention. From a system perspective, the invention provides for much more reliable matrix switching for large numbers of optical paths; light from input fibers accurately impinge on switch input mirrors, while light from output mirrors is properly aligned with target output fibers. Other advantages in addition to or in lieu of the foregoing are provided by certain embodiments of the invention, as is apparent from the description below with reference to the following drawings.

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the present invention.

FIG. 1 is a schematic diagram illustrating an optical switch that includes a wafer-based optical fiber positioner of the invention.

FIG. 2 is a schematic diagram illustrating the optical fiber and the lens of FIG. 1.

DETAILED DESCRIPTION OF THE INVENTION

Figure 3A:
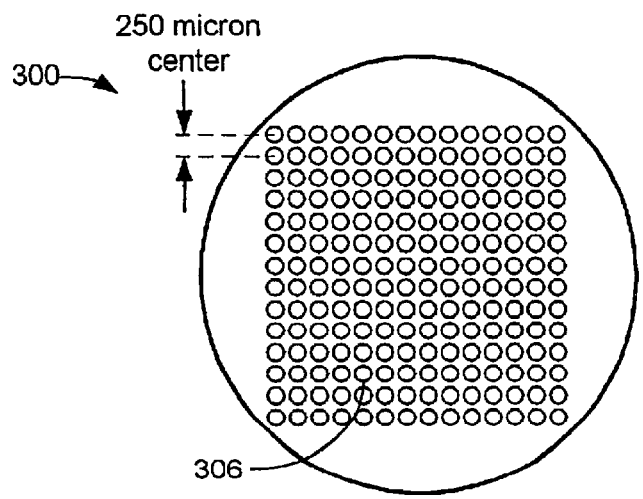
FIGS. 3A–3D collectively illustrate the fiber positioner of FIG. 1.

While described below using a circular silicon (Si) wafer that can be fabricated using conventional semiconductor processing technology, the invention is applicable to other wafer configurations and other materials such as, germanium, diamond, and any other material having suitable properties. Furthermore, while described as launching light into an optical switch that uses moveable mirrors to switch the light signals, the wafer-based positioner for aligning optical fibers can be used to align a plurality of optical fibers for any application.

FIG. 1 is a schematic diagram illustrating an optical switch 100 that includes the wafer-based optical fiber positioner 300 of the invention. The optical switch 100 receives input from a plurality of optical fibers, an exemplar one of which is illustrated using reference numeral 202. The optical fibers 202 are held in proper position with respect to each other and with respect to the lens positioner 400 by the wafer-based optical fiber positioner 300. For simplicity, the wafer-based optical fiber positioner will be referred to below as "fiber positioner" 300.

In accordance with another aspect of the invention, the lens positioner 400 is located after the fiber positioner 300. The lens positioner 400 includes a plurality of lenses, an exemplar one of which is illustrated using reference numeral 406. The lenses can be graded index (GRIN) lenses having a refractive index that changes from the center of the lens to the periphery of the lens, ball lenses, or any suitable lens. Each lens 406 corresponds to and is positioned so as to receive the light output from one of the optical fibers 202. Light travelling in the optical fiber 202 exits the fiber positioner 300 and impinges on a lens 406. When the light exits the fiber 202, the light begins to diverge. The lens 406 limits the divergence of the light and provides a near collimated light output 106 in the direction indicated by arrow 104. The light output 106 travels in what is referred to as "free space" region 108. The free space region 108 can be a vacuum or a gas filled space. A suitable gas is dry nitrogen to prevent the formation of condensation at low temperatures.

The near collimated light output 106 from lens 406 is directed towards a micro-mirror array 110. The micro-mirror array 110 includes a plurality of micro-mirrors, an exemplar one of which is illustrated using reference numeral 112. The light output 106 is directed toward micro-mirror 112, which reflects the light 114 into free space region 108 and toward micro-mirror array 120. Micro-mirror array 120 is similar in construction to micro-mirror array 110. Micro-mirror array 120 also includes a plurality of micro-mirrors, an exemplar one of which is illustrated using reference numeral 122. The micro-mirrors 112 and 122 in micro-mirror array 110 and micro-mirror array 120, respectively, are individually moveable. The light output 106 directed toward micro-mirror 112 can be directed to any micro-mirror in micro-mirror array 120. In this manner, the micro-mirror arrays 110 and 120 act as a beam-steering optical switch. It should be noted that the lens 406 directs light only toward micro-mirrors 112. However, micro-mirror 112 can be controlled so as to direct the light 114 onto any of the micro-mirrors located on micro-mirror array 120. The micro-mirrors 112 and 122 include an active feedback control system (not shown) that allows the position of each micro-mirror to be precisely controlled.

The light 114 is reflected by micro-mirror 122 into free space region 108 as light 124. The light 124 is directed towards lens positioner 402, which also includes a plurality of lenses, an exemplar one of which is illustrated using reference numeral 410. Generally, the micro-mirror 122 in the micro-mirror array 120 will focus light only onto the lens 410.

Another fiber positioner 302, which is similar in construction to the fiber positioner 300, is located after, and aligned with, the lens positioner 402 so that the output of each lens 410 is directed towards a corresponding optical fiber 130 associated with the fiber positioner 302. The light exits the optical switch 100 in the direction indicated by arrow 128. It should be noted that although illustrated as travelling in the direction from fiber positioner 300 into optical switch 100, the light can also travel in the opposite direction. When the light travels as shown in FIG. 1, the lenses 406 in the lens positioner 400 act as collimating lenses, while the lenses 410 in lens positioner 402 act as focusing lenses. This functionality is reversed for light travelling in a direction opposite that shown in FIG. 1.

FIG. 2 is a schematic diagram illustrating the optical fiber 202 and the lens 406 of FIG. 1. The optical fiber 202 is approximately 125 micrometers ($\mu$m), sometimes referred to as "microns" in diameter. The optical fiber 202 includes a core 204 and a cladding 206. The core is typically 8 $\mu$m in diameter for a single mode fiber. The light output of optical fiber 202 typically diverges, represented using reference numeral 208, when exiting the optical fiber 202. The diverging light 208 impinges on a lens 406. The lens 406 provides a near collimated light output 212. Near collimated light output 212 indicates that the light rays are nearly parallel. When light travels in the direction opposite that illustrated in FIG. 2, the near collimated light 212, when applied to the lens 406, is focused into the optical fiber 202.

FIGS. 3A–3D collectively illustrate the fiber positioner 300 of FIG. 1. FIG. 3A is a plan view illustrating the fiber positioner 300. The fiber positioner 300 includes a plurality of through holes, an exemplar one of which is illustrated using reference numeral 306. The through holes 306 are preferably located on 250 $\mu$m centers, and are approximately 135 $\mu$m in diameter to accept an optical fiber 202, which is approximately 125 $\mu$m in diameter. However, the through holes 306 may be located on other center positions, and may be fabricated in other diameters to accept optical fibers of different diameters.

Figure 3B:
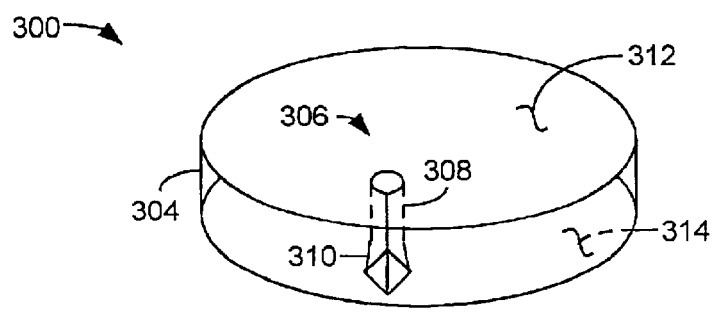

FIG. 3B is a perspective view of the fiber positioner 300 of FIG. 3A. The fiber positioner 300 is constructed using a wafer 304. The wafer 304 is approximately 500 $\mu$m thick and can be fabricated of silicon (Si) or other materials, as known to those having ordinary skill in the art. The wafer 304 includes a first surface 312 and a second surface 314. Each through hole 306 includes a first portion 308 toward surface 312 and a second portion 310 toward surface 314 and is preferably constructed to have a circular aperture toward surface 312 and to have an aperture at surface 314 larger than the aperture at surface 312. The aperture at surface 314 may be circular, square, rectangular, pyramidal, or another shape so long as the aperture is configured to guide an optical fiber from the portion 310 to toward the portion 308.

Figure 3C:
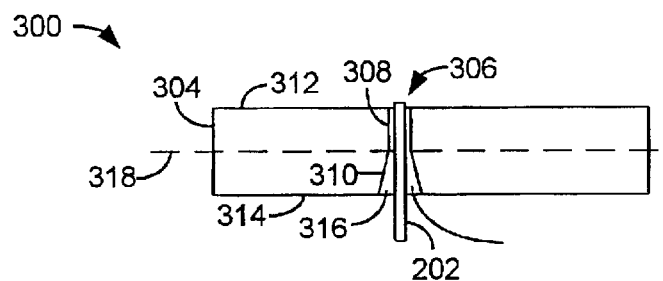

FIG. 3C is a cross-sectional view illustrating the fiber positioner 300 of FIGS. 3A and 3B. The through hole 306 and the portions 308 and 310 can be etched through the wafer 304 in any suitable manner and from any direction. For explanation purposes, the first portion 308 of the through hole 306 is preferably deep reactive ion etched (RIE) from surface 312 of the wafer 304 towards the centerline 318 of the wafer 304. The depth of the reactive ion etch varies depending on the application. Other alternative techniques for forming through holes in the wafer 304, as known to those having ordinary skill in the art, may also be used.

The second portion 310 of the through hole 306 is preferably wet etched and tapered, preferably in a pyramidal shape, from the surface 314 towards the center line 318 of the wafer 304 using a crystal plane etch stop process. The depth of the portion 310 will vary depending on the etching process and etch mask employed. It should be mentioned that the centerline 318 is used only as a reference point to describe the direction of the etch process and should not be interpreted to require that the portions 308 and 310 of through hole 306 meet at the centerline 318 or be etched in any particular order.

The taper of the portion 310 simplifies the installation of the optical fiber 202 as will be discussed below. The portion 310 of the through hole 306 is preferably pyramidal in shape when etching silicon because of the crystal plane alignment of the silicon substrate material. Other shapes may result if other substrate materials are used for the wafer 304. Preferably, the portion 310 of the through hole 306 is larger in diameter than the portion 308 to facilitate installation of the optical fiber 202 from the surface 314 past the surface 312. Other shapes besides pyramidal are possible, depending on the material and etch process employed.

After the through hole 306 is formed, the fiber 202 is inserted into the wafer 304 from the surface 314 so that it extends by a few μm or more above the surface 312 of the wafer 304. After the optical fiber 202 is inserted through the hole 306 and positioned as shown, an initially liquid bonding material, such as an epoxy, epoxy resin, acrylate, or materials having similar characteristics can be introduced into the through hole 306 through the portion 310. Due to capillary action, the bonding material 316 will typically flow into the cavity formed between the optical fiber 202 and the inside surface of the through hole 306. When cured, the bonding material will securely bond the optical fiber 202 in the through hole 306. Alternatively, the optical fiber 202 may be secured in the through hole 306 using other techniques, for example, but not limited to, a mechanical interference fit, snap fit, adhesive fit, etc.

Figure 3D:
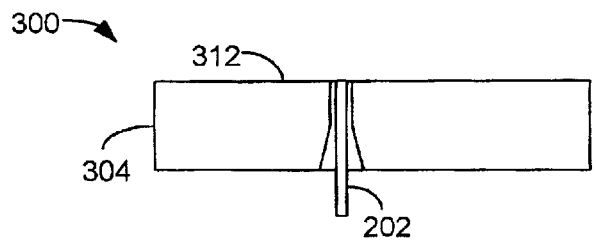

FIG. 3D is a cross-sectional view illustrating the fiber positioner 300 of FIGS. 3A through 3C. In FIG. 3D, the fiber 202 is polished so that it is flush with the surface 312 of the wafer 304. Optionally, the wafer can be thinned by grinding the surface 312 prior to polishing. In this manner, a plurality of fibers 202 can be inserted into a plurality of holes 306, thus providing precise two dimensional alignment of the optical fibers with respect to each other and precisely locating the optical fibers with respect to the optical switch 100 (FIG. 1).

Figure 4:
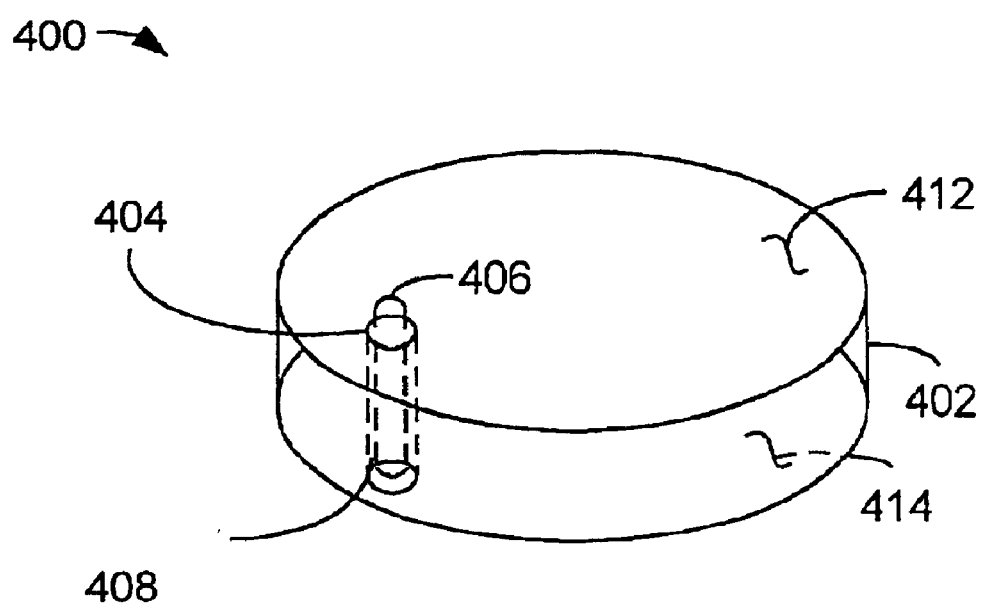
FIG. 4 is a perspective view illustrating the lens positioner of FIG. 1.

FIG. 4 is a perspective view illustrating the lens positioner 400 of FIG. 1. The lens positioner 400 is fabricated on a wafer 402. The wafer 402 can be constructed using silicon, in a similar manner to that described above with respect to the fiber positioner 300 (FIGS. 3A through 3D). The wafer 402 includes a plurality of through holes, an exemplar one of which is illustrated using reference numeral 404. The through holes 404 can be formed in the wafer 402 by etching as described above. However, the through holes 404 are preferably uniform in shape. Alternatively, other techniques may be useful for forming the holes 404 in the wafer 402. A lens 406 is inserted into each hole 404 so that it is either flush, recessed, or slightly protruding with respect to the surfaces 412 and 414 of the wafer 402. An initially liquid bonding material, such as epoxy or epoxy resin, is injected into the area between the lens 406 and the inside surface of the through hole 404 so that when the bonding material is cured, the lens 406 will be secured within the hole 404. The lens 406 can be a GRIN lens, a ball lens, or any suitable lens.

Furthermore, it is desirable to align the lens positioner 400 with the fiber positioner 300 so that the light output of each optical fiber 202 (FIG. 1) impinges on a corresponding lens 406. To achieve such alignment, a surface 412 or 414 of wafer 402 and a surface 312 or 314 of wafer 304 (FIG. 3B) can be formed to include registration features and an alignment component such as balls and/or rods. Such registration features and alignment components, sometimes referred to as a "kinematic mounting technique" ensure the alignment of the two wafers and are known to those having ordinary skill in the art.

In an alternative embodiment, the lens positioner 400 may be omitted and the light that exits each fiber 202 from the fiber positioner 300 can be directed towards a self-collimating and self-focusing medium. Such a medium is known to those having ordinary skill in the art as a Kerr medium. A Kerr medium is characterized as having a refractive index (n) that depends on the intensity (I) of the light that impinges on it. Therefore, the KBRR medium can collimate and focus the light in similar fashion to the lenses 406.

It will be apparent to those skilled in the art that many modifications and variations may be made to the preferred embodiments of the present invention, as set forth above, without departing substantially from the principles of the present invention. For example, many optical switching methodologies can benefit from a system that provides precise alignment of optical elements in two dimensions. The optical element may be optical fibers, lenses, or any other optical elements that are to aligned along a particular optical path. The optical elements are received and fixed within holes in the wafer. The holes can be formed in the wafer using any suitable processing techniques. All such modifications and variations are intended to be included herein within the scope of the present invention, as defined in the claims that follow.

What is claimed is:

1. A wafer apparatus for aligning optical, elements comprising:
    a wafer having a first surface and a second surface and a plurality of through holes, each of the plurality of through holes designed to accept an optical element;
    a plurality of optical elements, each optical element associated with and inserted into one of the through holes, wherein each through hole locates and secures one of the optical elements; and
    a self-focusing optical Kerr medium associated with the plurality of optical elements.

2. The apparatus of claim 1, wherein each of the plurality of through holes are etched into the wafer.

3. The apparatus of claim 1, wherein each of the plurality of through holes are reactive ion etched (RIE) into the first surface of the wafer and wet etched into the second surface of the wafer.

4. The apparatus of claim 3, wherein the wet etched through hole in the second surface of the wafer is tapered.

5. The apparatus of claim 4, wherein the through holes and the optical elements are arranged in a two dimensional array.

6. The apparatus of claim 4, wherein the tapered hole is pyramidal.

7. The apparatus of claim 1, wherein each optical element is bonded into a corresponding one of the plurality of holes using a material chosen from the group consisting of epoxy, epoxy resin and acrylate.

8. The apparatus of claim 7, wherein each optical element extends past the first surface of the wafer and is polished to be planar with the first surface of the wafer.

9. The apparatus of claim 1, wherein the optical element is a fiber.

10. The apparatus of claim 9, further comprising:
    an additional wafer, the additional wafer including a plurality of through holes; and
    a plurality of lenses, each lens associated with and inserted into each of the plurality of through holes in the additional wafer.

11. The apparatus of claim 10, wherein the wafer and the additional wafer are aligned so that light emanating from each optical fiber is directed toward a corresponding lens in the additional wafer.

12. The apparatus of claim 11, wherein the lenses collimate the light from each corresponding optical fiber.

13. The apparatus of claim 1, wherein the optical element is a lens.

14. A method for aligning optical elements using a wafer, the method comprising the steps of:

forming a plurality of through holes in a wafer, each of the plurality of through holes designed to accept a corresponding optical element;

inserting each optical element into one of the through holes, wherein each through hole locates and secures the corresponding optical element; and directing a light output from each of the plurality of optical elements into a self-focusing optical Kerr medium.

15. The method of claim 14, wherein the forming step includes the step of etching each of the plurality of through holes into the wafer.

16. The method of claim 15, wherein the etching step further includes the steps of:

reactive ion etching (RIB) into the first surface of the wafer; and wet etching into the second surface of the first wafer.

17. The method of claim 16, wherein the wet etched through hole in the second surface of the wafer is tapered.

18. The method of claim 17, wherein the tapered hole is pyramidal.

19. The method of claim 17, further comprising the step of arranging the through holes and the optical elements in a two dimensional array.

20. The method of claim 14, further comprising the step of bonding each optical element into a corresponding one of the plurality of holes using a material chosen from the group consisting of epoxy, epoxy resin and acrylate.

21. The method of claim 14, further comprising the steps of:

installing each optical element into a respective through hole so that each optical fiber extends past the first surface of the wafer; and polishing each optical fiber to be planar with the first surface of the wafer.

22. The method of claim 14, wherein the optical element is a fiber.

23. The method of claim 22, further comprising the steps of:

forming an additional wafer, the additional wafer including a plurality of through holes; and bonding a plurality of lenses into each of the plurality of through holes in the additional wafer.

24. The method of claim 23, further comprising the step of aligning the wafer and the additional wafer so that light emanating from each optical fiber is directed toward a corresponding lens in the additional wafer.

25. The method of claim 24, further comprising the step of collimating the light from each corresponding optical fiber.

26. The method of claim 14, wherein the optical element is a lens.

* * * * *